Feb. 26, 1963 G. DEL BO 3,078,790
CHECK WRITER
Filed Aug. 1, 1960 13 Sheets-Sheet 1

INVENTOR.
GIORGIO DEL BO
BY
Salvatore G. Militava
ATTORNEY

INVENTOR.
GIORGIO DEL BO
BY
Salvatore G. Militana
ATTORNEY

Feb. 26, 1963   G. DEL BO   3,078,790
CHECK WRITER
Filed Aug. 1, 1960   13 Sheets-Sheet 4

INVENTOR.
GIORGIO DEL BO
BY
*Salvatore G. Militana*
AT TORNEY

Feb. 26, 1963 G. DEL BO 3,078,790
CHECK WRITER
Filed Aug. 1, 1960 13 Sheets-Sheet 5

INVENTOR.
GIORGIO DEL BO
BY
*Salvatore G. Militana,*
ATTORNEY

Feb. 26, 1963   G. DEL BO   3,078,790
CHECK WRITER

Filed Aug. 1, 1960   13 Sheets-Sheet 6

INVENTOR.
GIORGIO DEL BO
BY
Salvatore G. Militano
ATTORNEY

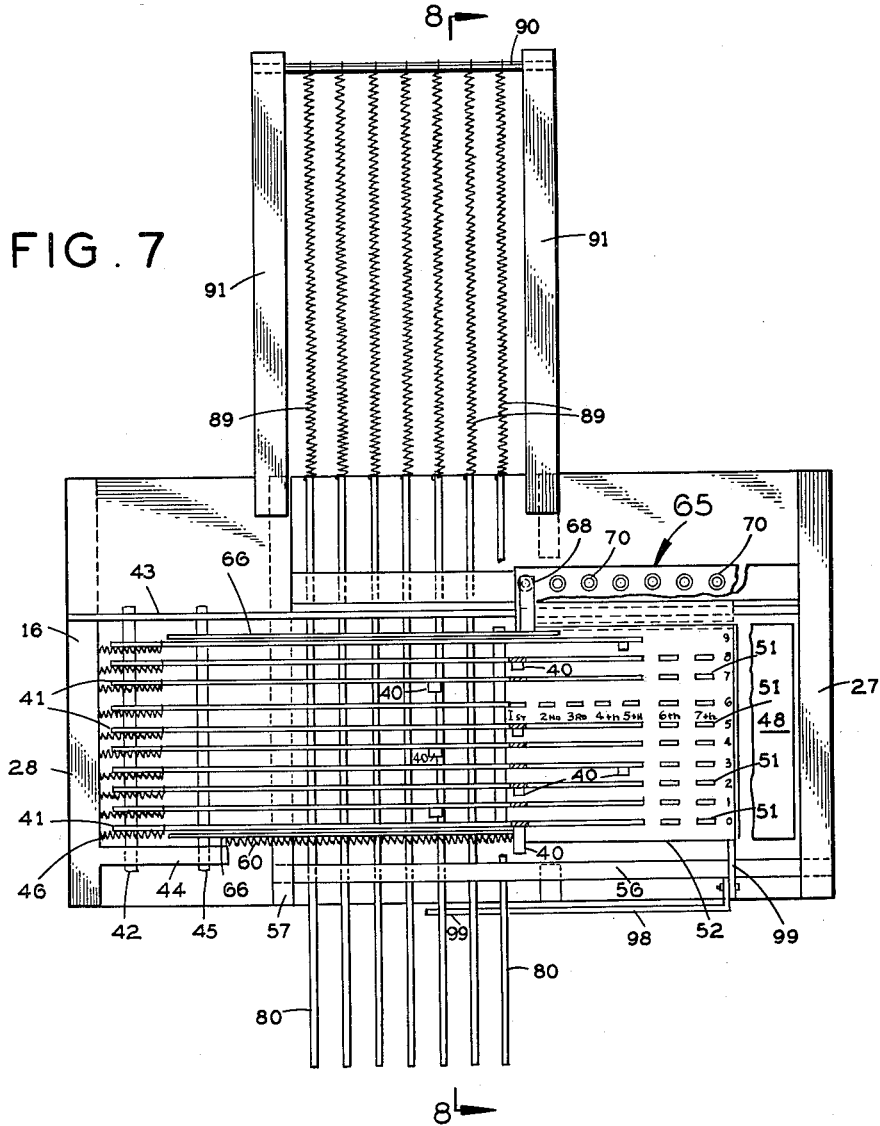

Feb. 26, 1963 G. DEL BO 3,078,790
CHECK WRITER
Filed Aug. 1, 1960 13 Sheets-Sheet 8
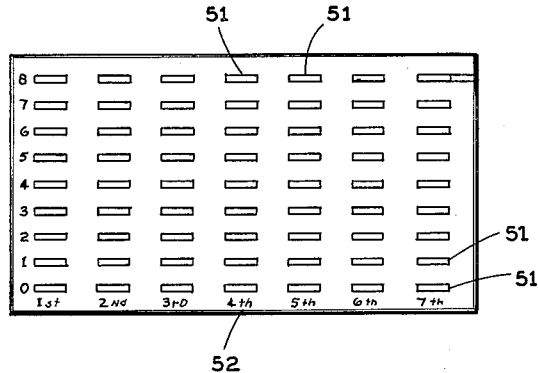
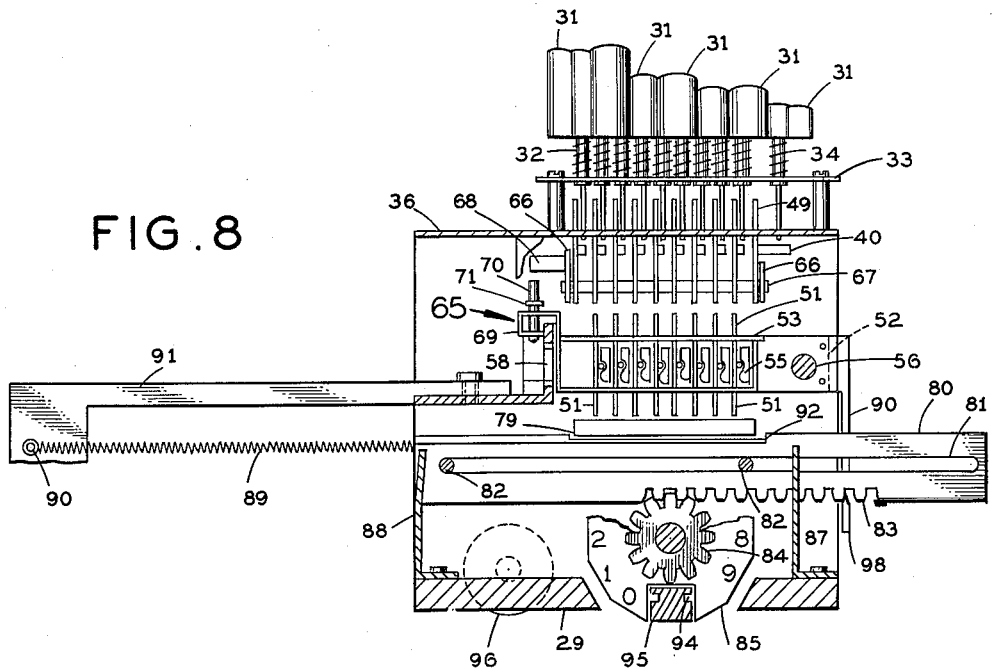
INVENTOR.
GIORGIO DEL BO
BY
*Salvatore G. Militano*
ATTORNEY Feb. 26, 1963 G. DEL BO 3,078,790
CHECK WRITER
Filed Aug. 1, 1960 13 Sheets-Sheet 10

INVENTOR.
GIORGIO DEL BO
BY
Salvatore G. Militana
ATTORNEY

Feb. 26, 1963

G. DEL BO 3,078,790

CHECK WRITER

Filed Aug. 1, 1960

INVENTOR.
GIORGIO DEL BO
BY
Salvatore G. Militana
ATTORNEY

INVENTOR.
GIORGIO DEL BO 3,078,790
CHECK WRITER
Giorgio Del Bo, Milan, Italy, assignor to Universal Business Machines Corp., Miami, Fla., a corporation of Florida
Filed Aug. 1, 1960, Ser. No. 46,712
10 Claims. (Cl. 101—95)

This invention is directed to check writers and is more particularly directed to a check writer which also imprints a signature of the maker on a check.

A principal object of the present invention is to provide a check writing machine with a keyboard having only ten keys as its full keyboard which is operated in somewhat the same manner as a ten keyboard adding machine thereby effecting a fast and effective printing of checks.

Another object of the present invention is to provide a check writer with a keyboard having only ten keys which is compact in construction and simple in its operation yet most efficient in the writing of checks.

A still another object of the present invention is to provide a check writer having mechanism for clearing the machine at any time prior to the check being imprinted.

A still another object of the present invention is to provide a check writer which when it is desired to print a number of identical checks or checks having certain common information thereon will permit the simple, rapid and effective repetition of the printing of the checks after having set the numeral buttons for the first check only.

A still another object of the present invention is to provide a check writer which can be so adjusted as not to result in any printing operation on a check in the event of an error and the operating lever having been actuated thereby preventing the necessity for nullifying or defacing the check.

A still further object of the present invention is to provide a check writer described as above which is relatively simple in construction and operation, capable of producing all of the above named functions with ease and yet is extremely fast in its operation in the printing of the necessary information on a check.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 5:
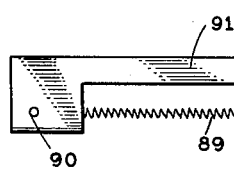
FIGURE 5 is a side elevational view of a self contained number selecting mechanism as seen removed from the check writer.
Figure 6:
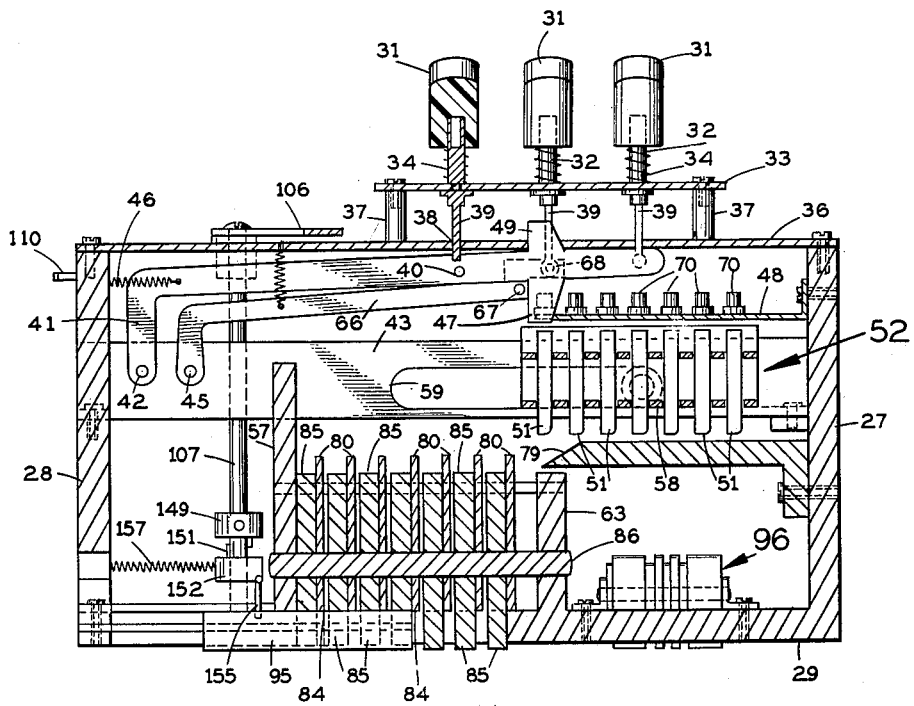

FIGURES 6 and 7 are sectional views taken along the lines 6—6 and 7—7 respectively of FIGURE 5.

FIGURE 8 is a sectional view taken along the line 8—8 of FIGURE 7.

Figure 9:
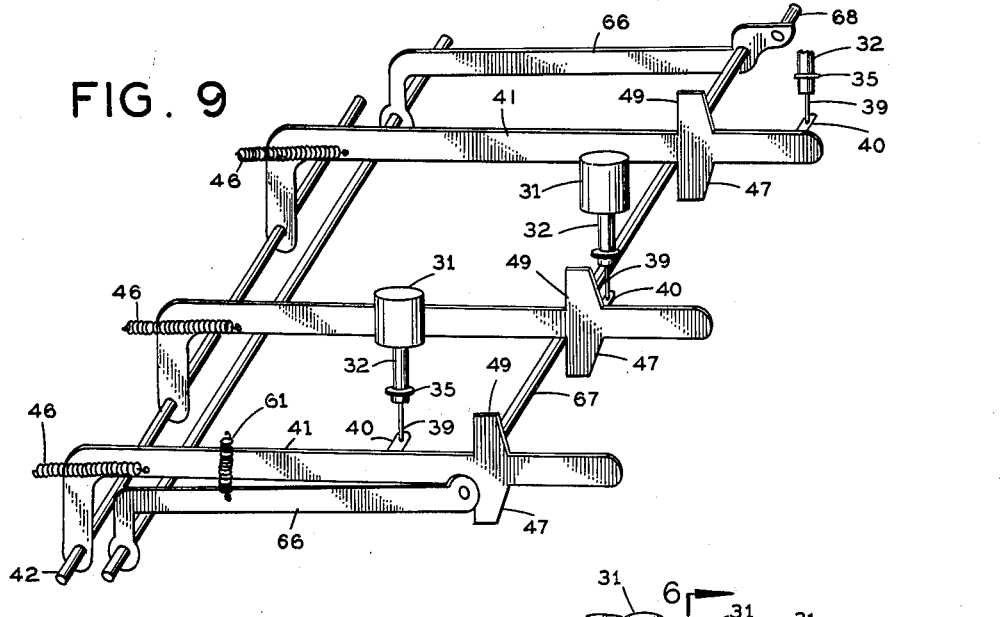

FIGURE 9 is a fragmentary perspective view of a numeral selection and escapement operating mechanism.

FIGURE 10 is a top plan view of its carriage showing the numeral selector stops.

Figure 11:
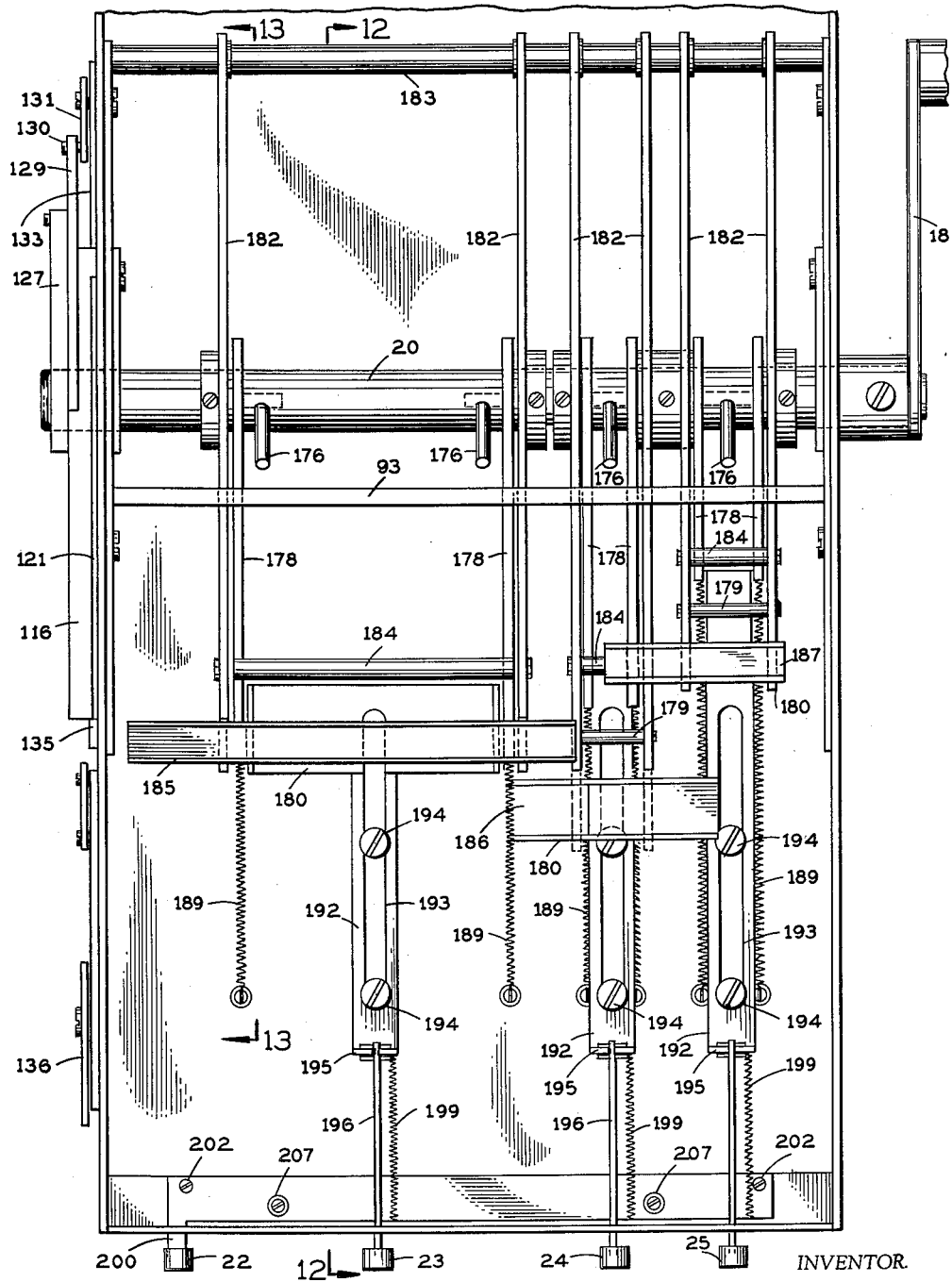

FIGURE 11 is a top plan view of the check writer as seen with the number selecting mechanism removed.

Figure 12:
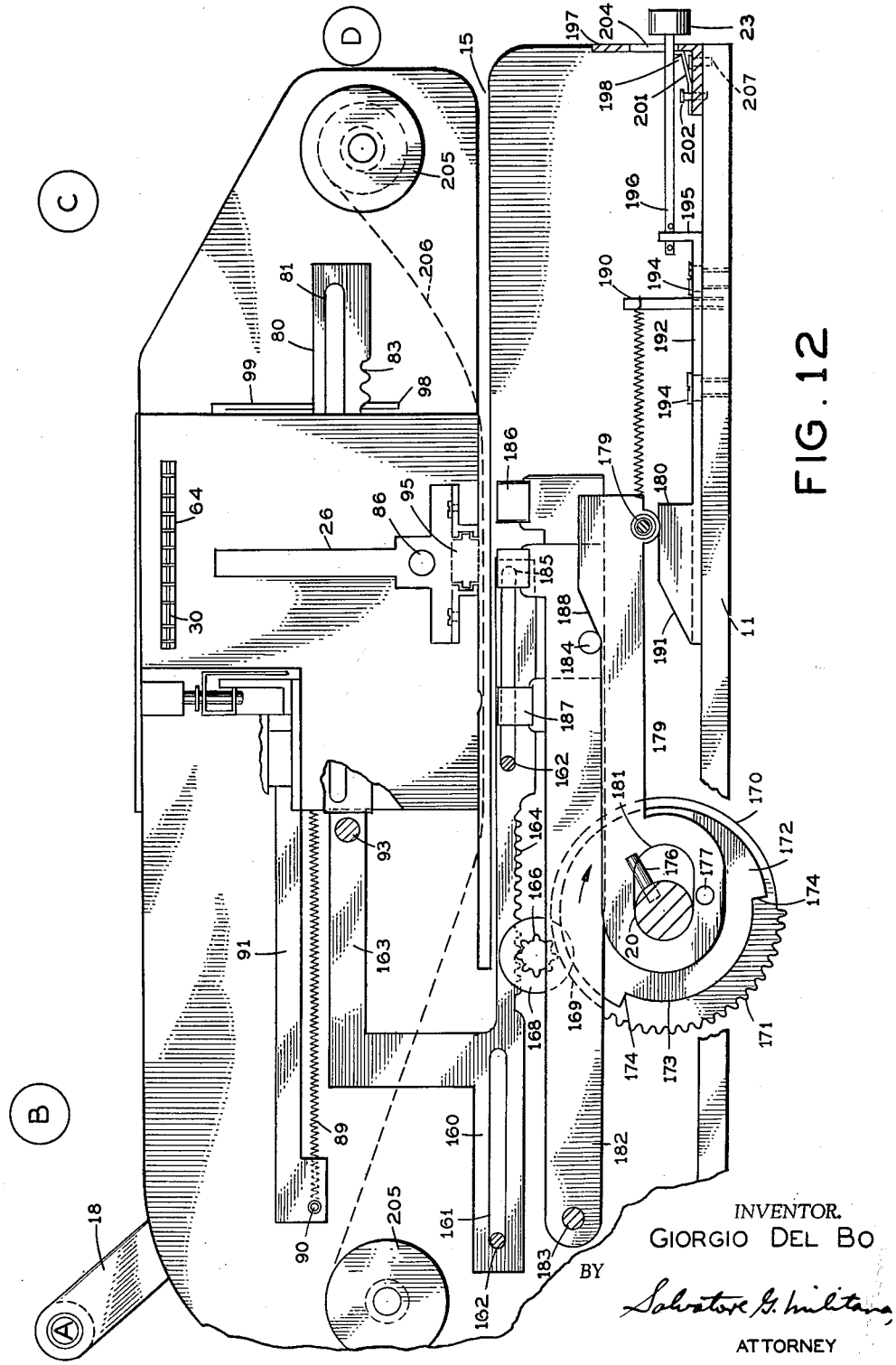
Figure 13:
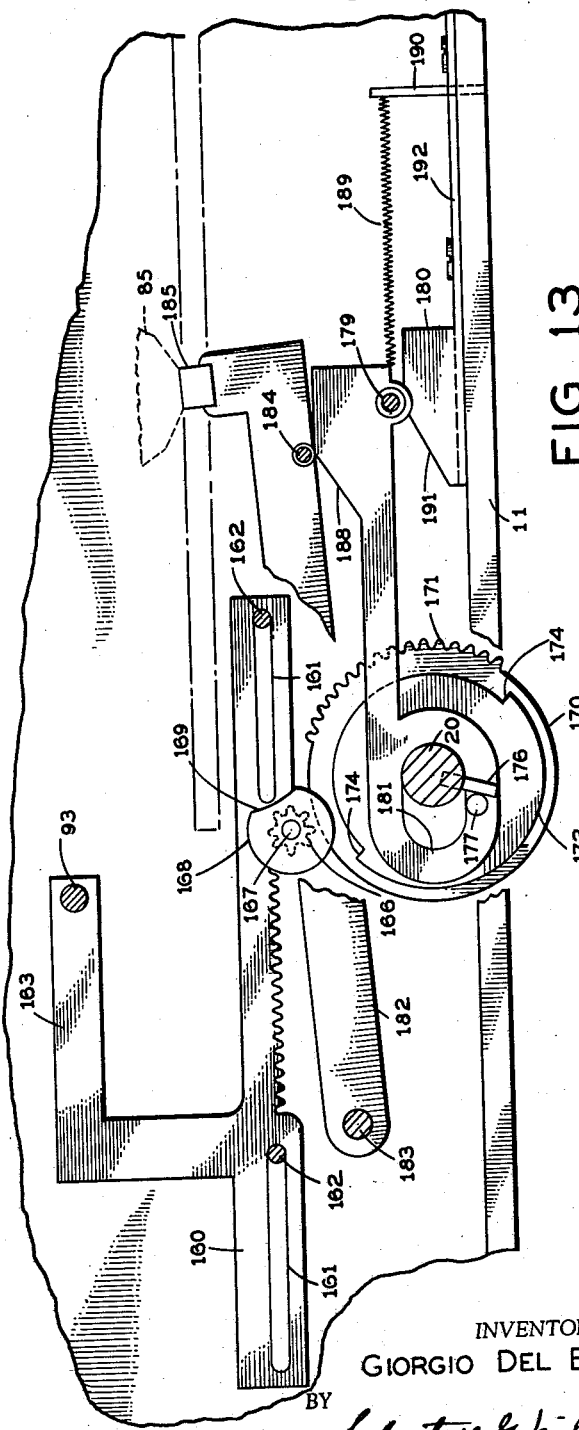

FIGURES 12 and 13 are vertical sectional views taken along the lines 12—12 and 13—13 respectively of FIGURE 11.

Figure 15:
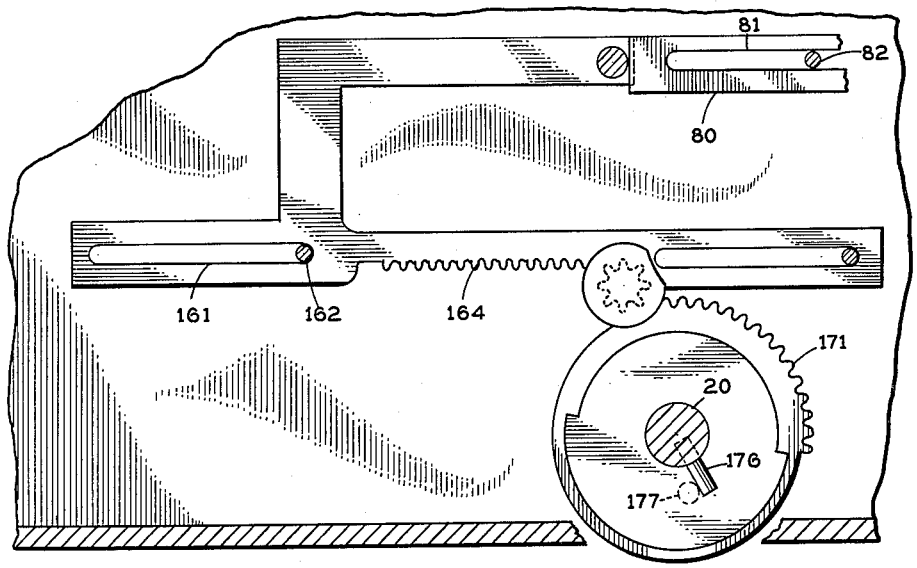
Figure 14:
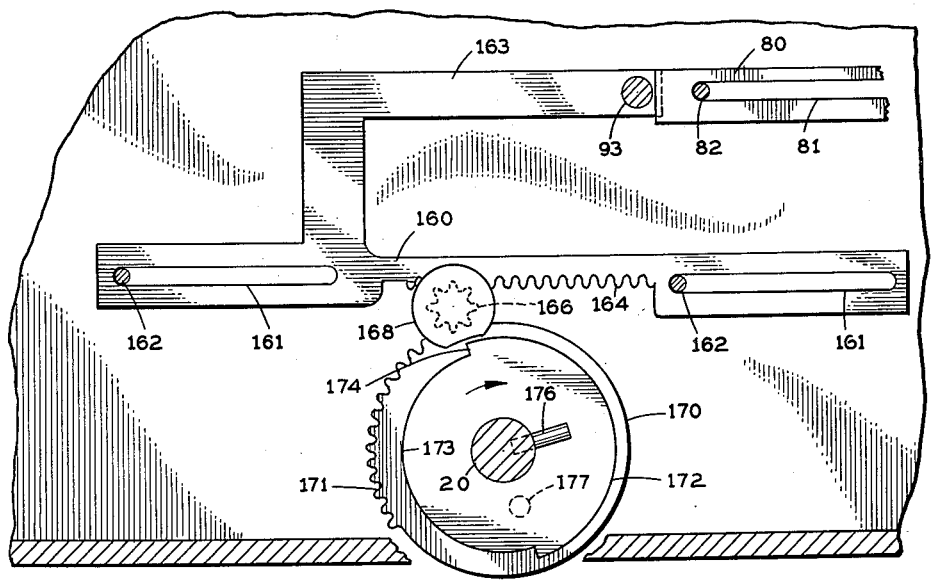

FIGURES 14 and 15 are fragmentary side elevational views of a rack operating mechanism for different positions of the operating lever.

Figure 4:
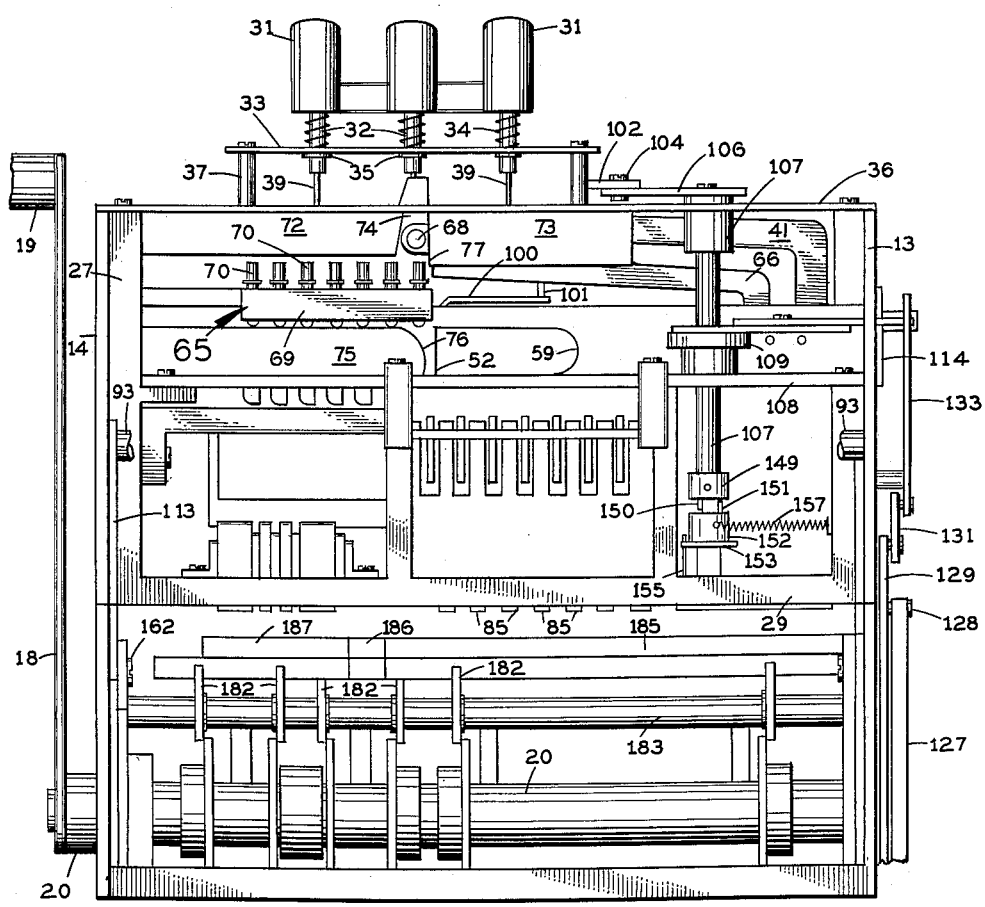
Figure 16:
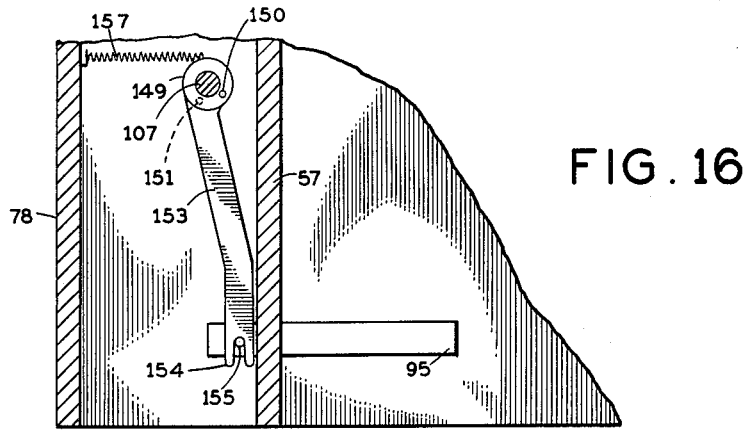

FIGURE 16 is a fragmentary cross sectional view of a "sum" printing plate retracting mechanism taken along the line 16—16 of FIGURE 4.

Figure 17:
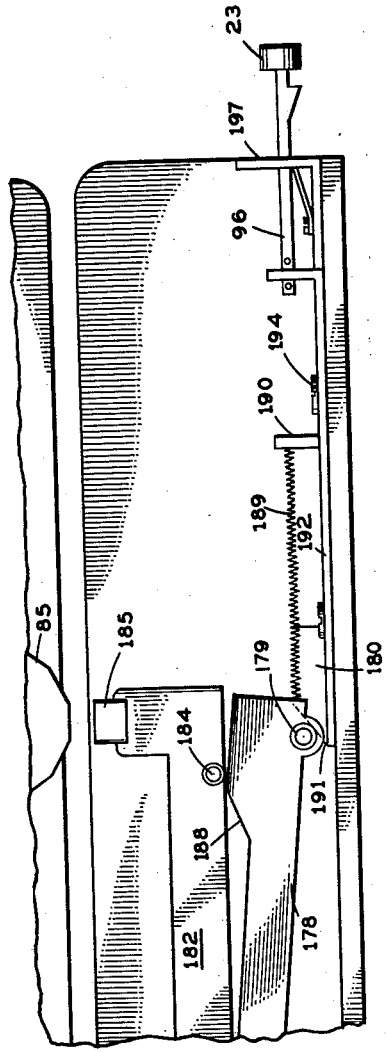

FIGURE 17 is a fragmentary side elevational view of the printing operating mechanism shown in its non-printing position.

Figure 20:
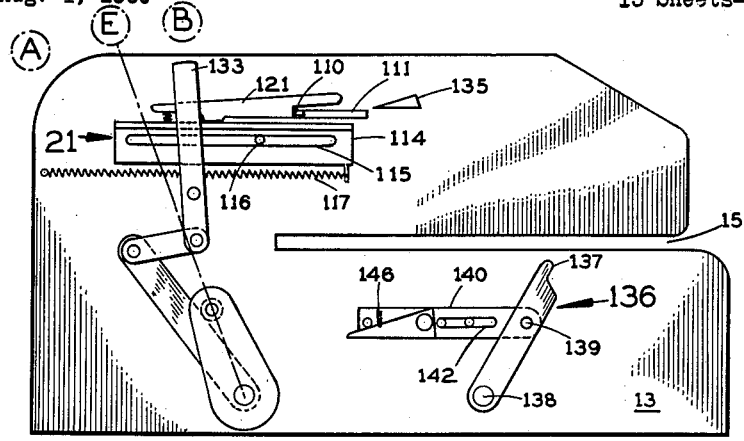
Figure 19:
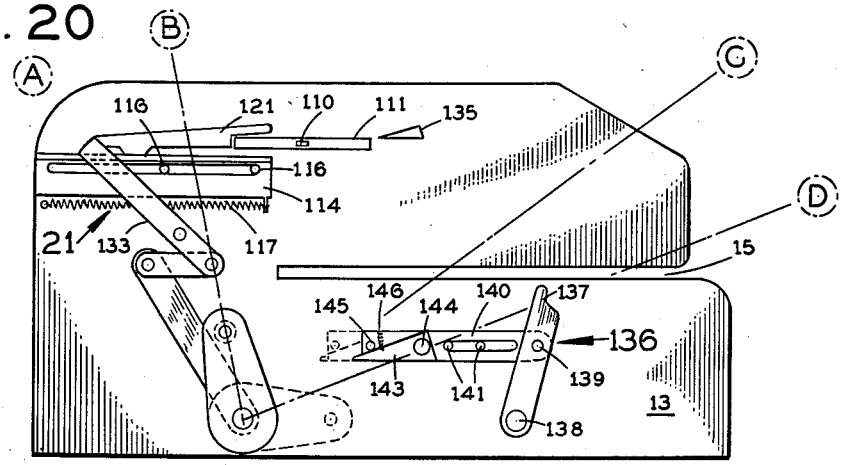
Figure 18:
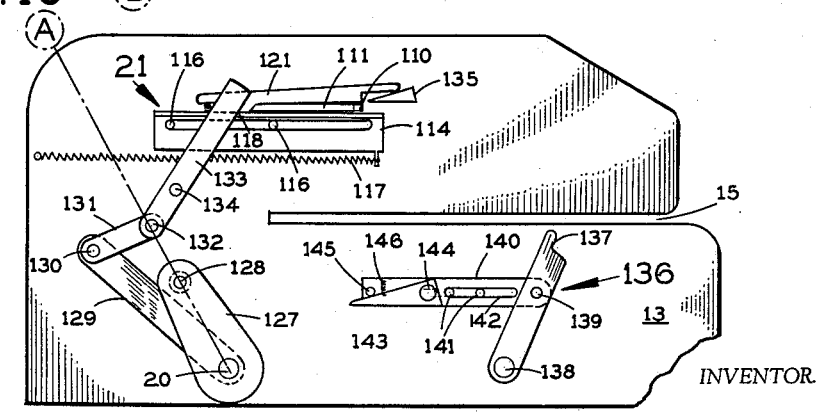

FIGURES 18–20 inclusive are side elevational views of a carriage return mechanism as seen at different positions A, B, C, D, and E of the operating lever.

Figure 21:
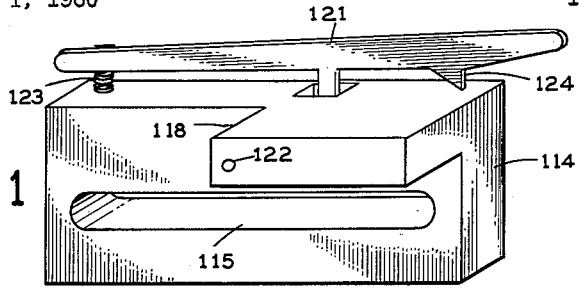

FIGURE 21 is a perspective view of a slide bracket and carriage return lever.

Referring to the drawings wherein like numerals are used to designate similar parts throughout the several views, there is shown my check writing machine whose main frame consists of a bottom wall 11 supported on legs 12 and upstanding side walls 13 and 14. Both of the side walls 13 and 14 are provided with a check receiving slot 15 which extends horizontally from the front edges thereof. When the check writer is in operation, a check is grasped at its ends and slipped through the slots 15 until it reaches the rear portion thereof. The check is then in its proper position to have imprinted thereon the amount of the check, date, signature and even the company name, if desired. An arcuate casing 16 is fitted over the top of the check writer 10 to house the mechanism thereof and is provided with openings for numeral buttons 31 forming a keyboard to extend therethrough. Also the casing 16 is slotted as at 17 to permit the slot 15 to be accessible for receiving checks as explained above.

Mounted on one side of the check writer 10 on the outside of wall 14 is an operating lever 18 having a handle 19 at one end and its other end being secured to a shaft 20 which extends the full width of the device having its ends journalled on the walls 13 and 14. On the outside of the other wall 13 there is a carriage return and clearing mechanism 21 and a repeat lever assembly 136. Also on the front of the casing can be seen a plurality of buttons 22, 23, 24, 25 all of which are connected to a matrix which control the printing operation of the check writing device as will be explained in detail hereinafter.

My check writer is constructed of two separable sections or units in which one unit X which contains the mechanism for selecting the number or sum desired and setting same preparatory to the printing of the check and the unit Y which accomplishes the printing, etc. of the check. Unit X constitutes a complete operating unit and is slidably mounted within unit Y. The frame of unit X consists of side walls 27 and 28, a bottom wall 29 and a top wall 36. The side walls 27 and 28 are each provided with a vertically disposed groove 26 for receiving tracks 126 mounted on the side walls 13 and 14 so that unit X may be readily positioned and removed from unit Y.

The letters A, B, C and D designate the critical positions of the operating lever 18 as it moves in both directions at which a certain function in the mechanism occurs. At position E on the return movement of operating lever 18, a carriage 52 is bodily returned to its starting position.

The keyboard consists of a plurality of buttons 31 on each of which is imprinted a numeral from zero to nine. See FIGURES 3-9 inclusive particularly. The buttons 31 are supported by a pin 32 whose upper end is fastened to the buttons 31 and whose lower end is slidably mounted through a bore in a button support plate 33. A coil spring 34 encircling each of the pins 32 extends between the button 31 and the upper surface of the button support plate 33 to yieldingly urge the buttons 31 to their extended or upward position with a shoulder 35 mounted on the pin 32 and engaging the lower surface of the button support plate 33 to limit the upward movement of the buttons 31. The button support plate 33 is secured by spacer bolts 37 to a top wall 36 provided with a plurality of bores 38 for receiving pins 39 secured to the lower ends of the pins 32.

Below and in alignment with each of the pins 39 is a lug 40 mounted on the side wall of an L-shaped numeral selector lever 41 pivotally mounted by a pivot pin 42 secured at its ends to a plate member 43 and a bracket 44. The plate member 43 extends the full width of the housing 20 having its ends secured to the walls 27 and 28 while the bracket 44 is secured to the wall 28 and extends a short distance to support a further pivot pin 45 whose other end is mounted on the plate member 43. Since there are nine numeral buttons 31 there are nine numeral selector levers 41 each of which will pivot downwardly about the pivot 42 when the appropriate numeral button 31 is depressed by virtue of the pin 39 abutting against the lug 40. A coil spring 46 secured to each of the numeral selector levers 41 at one end and at its other end to a bar 30 in a slot 64 formed in the wall 28 maintains the levers 41 resiliently in their upper position. The numeral selector levers 41 are maintained accurately vertically in their proper positions by depending finger portions 47 which are received by slots formed in a plate member 48 below which is mounted a carriage assembly in addition to an upstanding finger portion 49 received by slots formed in the top wall 36.

The carriage assembly is provided with a plurality of rows of vertically disposed numeral selector stops 51. There are nine numeral selector stops 51 in each row, each such stops 51 being actuable upon depressing the appropriate numeral button 31. There are shown seven rows of stops 51 (see FIGURE 10) although any desired number of rows of stops 51 may be utilized depending upon the largest desired amount to be imprinted on a check by the check writer. In the device as shown having seven rows of numeral selector stops the largest amount capable of being imprinted is $99,999.99. The first row of numeral selector stops 51 lie directly beneath and in alignment with the finger portions 47 so that when any one of the numeral selectors 41 is actuated, the finger portion 47 will impinge on the appropriate stop 51. The stops 51 are vertically slidably mounted on a carriage 52 and are each provided with a spring detent 53 positioned alongside each of the stops 51. The spring detent 53 is engaged by a shoulder 54 mounted on each of the stops 51. The shoulders 54 are normally received by an arcuate portion forming a recess 55. When the stops 51 are depressed, the lower portion of the spring detent 53 will flex inwardly and engage the shoulder 54 at its lower end to maintain the stop 51 in its lowered position.

The carriage 52 which is mounted for slidable movement in a direction between the walls 27 and 28 is slidably supported on one side by a rod 56 which extends through bores in the carriage 52 and has its ends secured to the wall 27 and an intermediate wall 57. Note FIGURES 6 and 8. The other side of the carriage 52 is slidably supported by a roller 58 mounted on the side wall of the carriage 52 and resting in a slot 59 formed in the end wall plate member 43. A coil spring 60 as seen best in FIGURE 3 secured at one end to the wall 28 and at the other end to the carriage 52 yieldingly urges the carriage 52 to slide in the direction of the wall 28. However, an escapement assembly 65 (see FIGURE 4) mounted on the carriage 52 prevents the movement of the carriage 52 until one of the numeral buttons 31 has been depressed and released whereupon the escapement assembly 65 will permit the carriage to move only a distance equal to that between the rows of stops 51.

Pivotally mounted on the pivot pin 45 are a pair of excapement actuating levers 66 each lever 66 positioned beyond the end numerical selector levers 41. The ends of the escapement actuating levers 66 are joined by a rod 67 which is positioned below and in the path of all of the numerical selector levers 41 when the latter are actuated by depressing any of the numerical buttons 31. It is to be noted that when a single numerical button 31 is depressed, only one numerical selector lever 41 will be actuated causing a single numerical selector stop 51 to be depressed and the escapement actuating levers 66 to be actuated by a lug 68 mounted on one of the escapement actuating levers 66. A coil spring 61 secured to each of the levers 66 resiliently maintain the levers 66 in their upper or non-operating position.

The escapement assembly 65 consists of a support bracket 69 mounted along the side edge of the carriage 52 with a plurality of vertically slidable escapement stop members 70 thereon. There are seven stop members 70 each of which is in alignment with each of the rows of numerical selector stops 51. The stop members 70 are provided with a shoulder 71 which limits the downward position of the stop members 70 on the bracket 69 and are frictionally tight within bores formed in the bracket 69 so that the stops 70 will remain in the vertical position that they are placed by a positive force applied thereon. Above the row of stop members 70 and in alignment therewith is a header formed of two portions 72 and 73 separated by a slot 74 in which the stop actuating lug 68 extends. See FIGURE 4. Below the row of stop members 70 and also in alignment thereto is a foot member 75 which engages the lower ends of the stop members 70 except the first stop member 70 below which there is a cam surface 76 that engages the lower end of the stops 70 when the carriage 52 is returning to its original position and cause those stops 70 that had been depressed to slide upwardly to their upper or normal position. The header portion 73 is slightly lower than the header portion 72 to thereby form a shoulder 77 which is in the path of the top portion of the stop members 70 so that the first stop member 70 which is in its upper position will impinge on and remain abutted against the shoulder 77 until depressed.

When any one of the numeral buttons 31 has been depressed against the coil spring 33, as for example the first digit of a number to be imprinted on a check the pin 39 will bear against the appropriate lug 40, to compel the numeral selector lever 41 to pivot about the pin 42 and cause the depending finger portion 47 to depress the appropriate numeral selector stop 51. The numeral selector lever 41 will simultaneously bear against the rod 67 attached to the escapement actuating levers 66 and cause the latter to pivot about its pin 45 and carry the lug 68 of the escapement actuating lever 66. The lug 66 will push downwardly on the stop member 70 lying in its path which had been abutting against the shoulder 77. As the stop 70 moves to a position below the shoulder 77, the carriage 52 will slide along in the direction of the wall 28 due to the coil spring force 60. The carriage 52 will move until the adjacent stop member 70 abuts against the lug 68. Then when the numeral button 31 is released, the coil springs 61 will compel the escapement actuating levers 66 to pivot to their upward position and the lug 68 to slide upwardly in the slot 74 above the top of the stop members 70 to release the stop member 70 which was previously abutting against the lug 68. This stop member 70 will now move forwardly along with the carriage 52 and come to a stop when the stop member 70 abuts against the shoulder 77. It can be seen that with each actuation of a numeral button 31, the carriage will move the distance equal to that between stop members 70 that is also equal to that between the rows of numeral selector stops 51 so that second row of numeral selector stops 51 are now positioned below the row of depending finger portions 47 of the numeral selector levers. Now the second digit of desired number is depressed and the cycle of operation described above will be repeated. This cycle is repeated until all of the proper numeral button 31 constituting the number to be printed on a check have been depressed much in the same manner as in a conventional ten button adding machine. There is no need for selector stops 51 for the numeral "9" as is explained hereinafter.

For example if it is desired to imprint on a check the sum of $536.27, then the first numeral button 31 to be depressed is the one indicated by the numeral "5." This will cause the numeral selector stop 51 in the first row, 6th from the front of the check writer 10 to become depressed. See FIGURE 10. The carriage assembly 50 now moves one space to the left and the numerical "3" button is depressed. The fourth numeral selector stop 51 in the second row is depressed thereby. Again the carriage assembly 50 will move one space to the left. The numeral button "6" is manually depressed next, causing the seventh numeral selector stop 51 in the third row to become depressed with the carriage assembly 50 moving one space to the left. The numeral button "2" is depressed, the third numeral selector stop 51 in the fourth row will be depressed thereby and the carriage assembly 50 will move another space to the left. The numeral button "7" will now be depressed causing the eighth numeral selector stop 51 in the fifth row to become depressed as the carriage assembly moves again one space to the left. The numeral selector stops 51 are now so actuated that when the imprinting mechanism as hereinafter described is actuated the number $536.27 will be imprinted on the check.

As the carriage assembly 50 moves one space to the left upon each actuation of the numeral buttons 31, the rows of numeral selector stops 51 moves in a plane above but in vertical alignment with rack members 80 of which there are seven since the check writer 10 has been constructed to limit itself to writing sums of amounts having seven or less integers. See FIGURE 8. The rack members 80 are provided with a slot 81 for receiving tie rods 82 whose ends are secured to the intermediate wall 57 at one end and another intermediate wall 63 at the other end. The rack members 80 are so positioned with relation to the carriage assembly 50 that as the latter moves one space to the left when the numeral buttons 31 are depressed, the rows of numeral selector stops 51 will align themselves with the racks 80. For example, when the first numeral button 31 is depressed, the carriage 50 will move to the left one space and first row of numeral selector stops 51 will be in vertical alignment with the first track member 80. When the second numeral button 31 is depressed, the second row of numeral selector stops 51 will become aligned with the first rack member 80, while the first row of numeral selector stops 51 will have moved one space and now be in alignment with the second rack member 80. When five numeral buttons 31 have been depressed, the first five rows of numeral selector stops 51 will find themselves in individual alignment with the first five rack members 80.

The rack members 80 are each provided with a plurality of teeth 83 which are in mesh engagement with a gear 84 that is secured to a numeral printing wheel 85. The gears 84 and wheels 85 are mounted for rotational movement on a shaft 86 extending between intermediate walls 57 and 63. The racks 80 are positioned in and guided by slots formed in a front and rear wall 87 and 88 respectively with a coil spring 89 secured to each of the racks 80 for yieldingly urging the racks 80 to slide rearwardly. A movable stop member 93 engages and abuts against the rear end portions of the racks 80 to prevent movement of the racks 80 until after the numeral buttons 31 have been actuated as is explained in detail hereinafter. See FIGURES 12–15 inclusive. The coil springs 89 extend rearwardly to a cross bar 90 which is secured to rearwardly extending support arm members 91. See FIGURES 7 and 8. Each of the rack members 80 is provided at its upper edge portion with a shoulder 92 all of which are in alignment and in the position at the right as shown by FIGURE 8 when the check writer 10 is ready to be operated.

The numeral printing wheels 85 are polygonal in shape having twelve sides for the sake of convenience though only eleven of the sides are put to use. On ten of the sides of the printing wheels 85, type numbering from 0–9 are positioned, the remaining two sides having no type or printing matter thereon. There is a total of seven printing wheels 85, one for each digit of the total number to be printed. The first three printing wheels 85 have two blank sides while the remaining four printing wheels 85 nearest the intermediate wall 57 have one blank side and a slotted portion 94 for receiving a printing plate 95 on which there is type that will print "sum $" on a check. The printing wheels 85 as well as the printing plate 95 extend a relatively short distance below the lower surface of the bottom wall 29 to permit the printing operation to take place.

Referring again to the illustration of printing the sum of $536.27 on a check, the carriage 52 has slid to the left a total of five spaces so that the first row of numeral selector stops 51 will be above and aligned with the fifth rack member 80 and the remaining rows of numeral selector stops 51 will align with the succeeding rack members 80, each row of stops 51 being in alignment with a rack member 80. When the rack stop member 93 has been removed from its position abutting against the rack members 80 and made to slide out of the path of the rack members 80 as explained in detail hereinafter. The coil springs 89 will urge and cause the rack members 80 to slide rearwardly on the tie bars 82 and effect a rotation of the gears 84 meshed therewith which cause the rotation of the numeral printing wheels 85.

The numeral selector stops 51 that have been depressed will lie in the path of the shoulder 92 so that the amount of movement of the racks 80 will be determined by the position of the depressed stops 50. The fifth rack 80 will slide 6/10 of the total distance rearwardly causing the gear 84 and numeral printing wheel 85 to rotate to its sixth side on which the numeral "5" is positioned, which side will now be lowermost ready to print the numeral "5" on a check. The remaining four racks 80 respectively will be permitted to slide until its shoulder 92 abuts against the aligned depressed numeral selector stop 51. There is now on the lowermost side of the numeral printing wheels 85 the numerals 536.27 in that order, which numerals will be printed on a check as explained in detail hereinafter. Since the fourth and fifth numeral printing wheels 85 rotated their respective slots 94 out of alignment with the slots 94 of the sixth and seventh wheels 85, the printing plate 95 will slide through the slots 94 of the sixth and seventh wheels 85 and come to rest against the fifth wheel 85. Then when the printing operation is effected the check will have printed thereon "sum $536.27." This arrangement assures the positioning of the dollar sign immediately advancement to the first numeral being printed on the check.

To prevent rotational movement of the first three numeral printing wheels 85, the first three rack members 80 are kept immobile by a rack stop plate member 98 which secured by an arm 99 to the carriage 52. The rack stop plate member 98 engages the teeth 83 of the first three racks 80. As a numeral button 31 is depressed the carriage 52 will move one space carrying with it the rack stop member 98 to slide to the left beyond a shoulder 125 to free the first rack member 80. As further numeral buttons 31 are depressed, the rack stop plate member 98 continues to free the rack members 80. When the seventh numeral button 31 has been depressed all of the rack members 80 will be free to slide rearwardly and rotate the numeral printing wheels to their proper positions.

Figure 1:
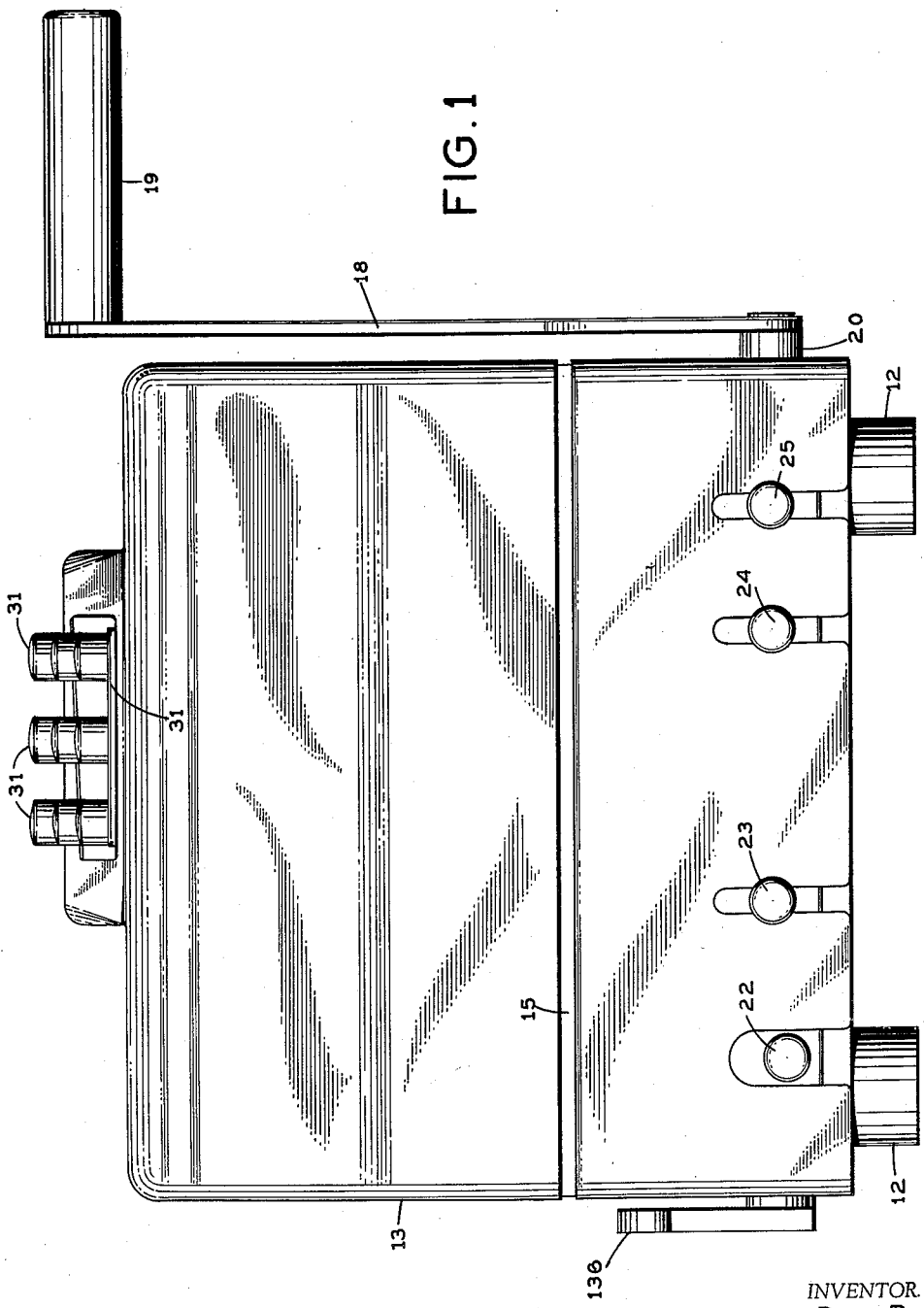
FIGURE 1 is a front elevational view of a check writer constructed in accordance with my invention.
Figure 2:
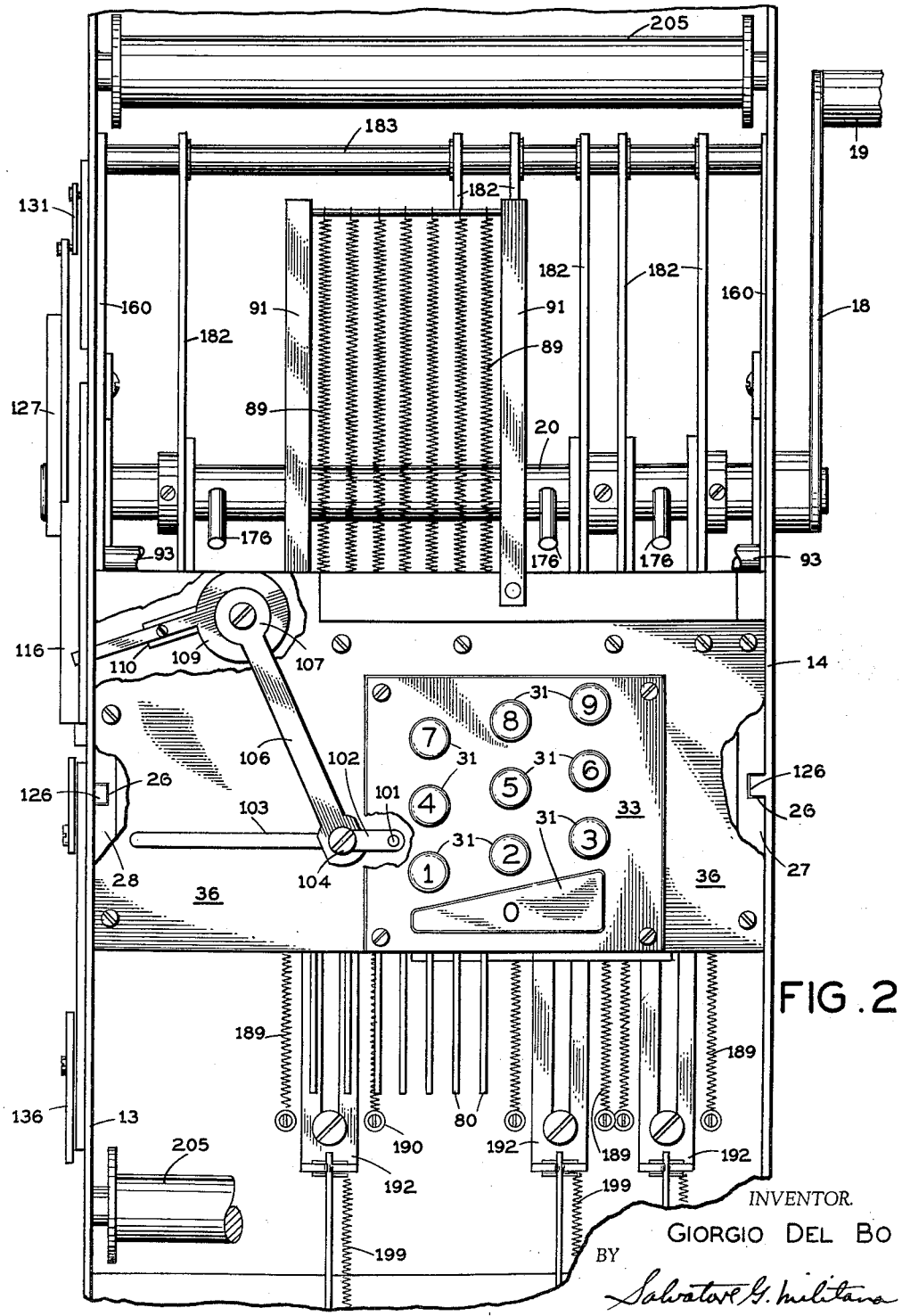
FIGURE 2 is a top plan view with the outer casing removed and parts broken away.
Figure 3:
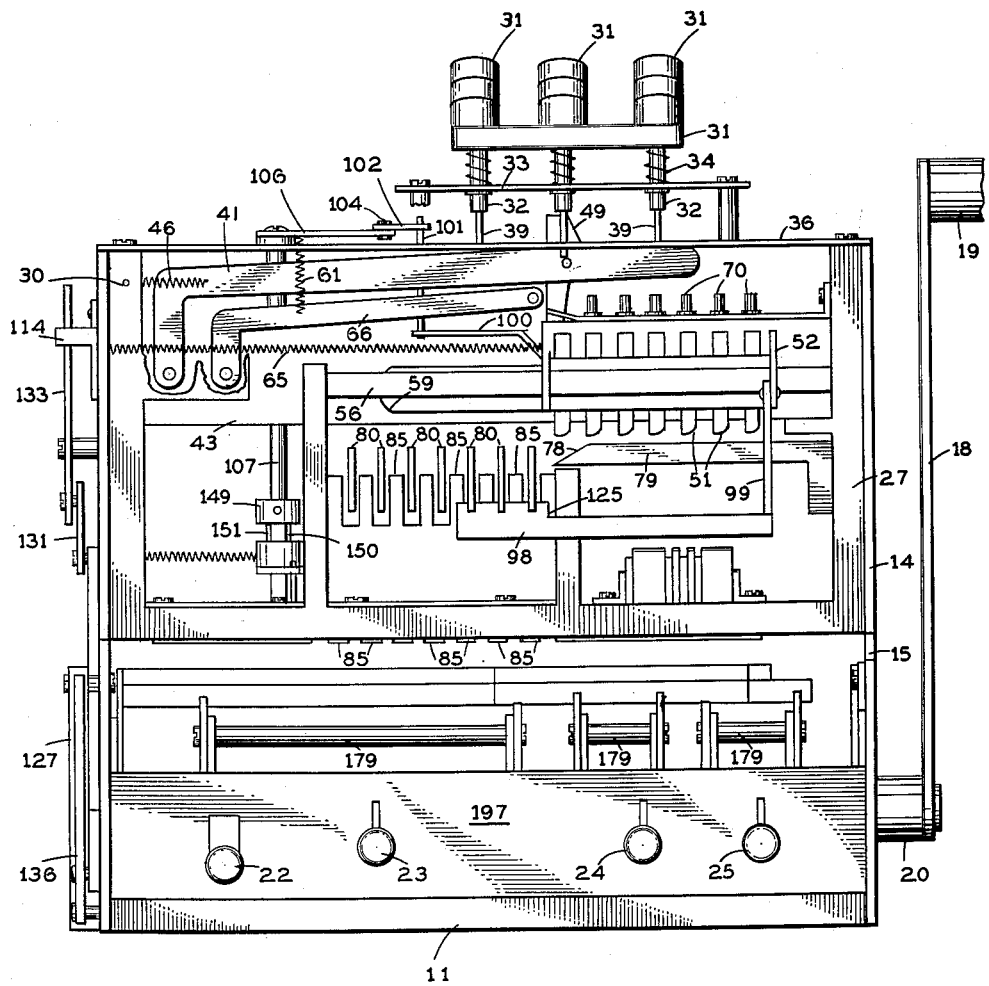
FIGURES 3 and 4 are front and rear elevational views, respectively thereof.

Means are provided for returning the carriage 52 to its original position after each printing operation comprising an arm 100 secured to the carriage 52 and extending in the direction of the wall 28, having an upstanding pin 101 mounted on the free end thereof. See FIGURES 2–4 inclusive. The pin 101 extends through an elongated slot 103 in the top wall 36 and has a link 102 rotatably mounted on the top of the pin 101 at one end. The other end of the arm 102 is provided with a pivot pin 104 received by a bore therein; the pin 104 being secured to the end of a crank 106. The other end of the crank 106 is secured to the top of a shaft 107 which extends downwardly through a bore in the top wall 36 through a bore in the support bar 108 to the lower wall 29 where it is journalled. Mounted on the shaft 107 is an enlarged collar 109 to which is secured an adjustable carriage return lever 110.

The carriage return lever 110 extends through a slot 111 formed through the side walls 28 and 13. On the outside surface of the side wall 13 there is a carriage return mechanism 21 (see FIGURES 18–21 inclusive) consisting of a slidable bracket 114 having an elongated slot 115 in which a pair of pins 116 extend; the pins 116 being secured to the side wall 13. A coil spring 117 extending between a forward portion of the bracket 114 and adjacent the rear edge of the side wall 13 yieldingly urges the slide bracket 114 to the rear. The slide bracket 114 is provided with a shoulder 118 and also an opening 119 for receiving a pivot arm 120 of a slide lever 121. The pivot arm 120 is pivoted to the bracket 114 by a pivot pin 122 with the forward end portion of the slide lever 121 urged downwardly by a spring 123 extending between the top edge of the slide bracket 114 and the rear portion of the slide lever 121. A shoulder 124 on the lower forward edge portion of the slide lever 121 is adapted to engage the free end of the carriage return lever 110 to return the carriage 52 to its original position as is explained in detail hereinafter.

Means are provided to place the slide bar 114 and slide lever 121 at their proper positions as determined by the position of the operating lever 18 which is secured to the main shaft 20 comprising a crank 127 secured to the free end of the main shaft 20 along the outside surface of the side wall 13. The crank 127 has a pin 128 on its free end extending inwardly toward the side wall 13 for engaging a link 129 which is so mounted at one end to the main shaft 20 as to rotate freely of the main shaft 20. At the other end of the link 129 there is pivotally mounted as at 130 an intermediate link 131 whose other end is pivotally mounted as at 132 to the lower end of a lever 133. The lever 133 is pivotally secured to the side wall 13 by a pivot pin 134 while the upper portion of the lever 133 engages the shoulder 118 of the slide bracket 114. When the operating lever 18 is at position A the carriage return mechanism 21 will be positioned as shown by FIGURE 18. A wedge shaped member 135 secured to the side wall 13 as shown by FIGURE 18 engages the forward end of the slide lever 121 to pivot it upwardly so that the shoulder 118 lies in a plane above that of the carriage return lever 110. Now when the operating lever 18 is brought forwardly to position B, the crank 127 and pin 128 will rotate away from the link 129 to permit rotation of the lever 133 about its pivot pin 134. The coil spring 117 will now compel the bracket 114 to slide rearwardly to the position shown by FIG. 19. Further movement of the operating lever 18 to position D will not affect the position of the carriage return mechanism 21 until the return movement of the operating lever 18 and the position B is reached. The pin 128 on the crank 127 will bear against link 129 to cause the forward sliding movement of the bracket 114 and slide lever 121 to commence sliding forwardly on the pins 116. When the operating lever 18 has reached position E as shown by FIGURE 20, the shoulder 118 engages the carriage return lever 110 pushing the latter forwardly in the slot 111. Movement of the carriage return lever 110 causes the shaft 107 to rotate and swing the arm 106 in the direction of the carriage 52 carrying the link 102 and the pin 101 along the slot 103. The pin 101 being secured to the carriage 52 will force the carriage 52 to slide in the direction of the wall 27 against the coil spring pressure 60 to its original starting position. As the position A is reached, the slide lever 121 will engage the wedge member 135 and pivot upwardly to release the carriage return lever 110 as the carriage 52 arrives at its original position.

Also mounted on the side wall 13 is a repeat actuating mechanism 136 consisting of an actuating lever 137 that is pivoted by a pin 138 to the side wall 13 at one end and the other end being free. At approximately its mid-portion, the repeat actuating lever 137 is pivotally secured as at 139 to a slide latch 140 slidably mounted on pins 141 secured to the side wall 13 and received by a slot 142 in the slide latch 140. Extending beyond the front end of the slide latch 140 is a dog 143 pivotally secured to the slide latch 140 by a pivot pin 144 with a stop pin 145 secured to the slide latch 140 and abutting against the top edge of the pivoted dog 143 to prevent the latter from pivoting in an upward direction. A coil spring 146 permits the pivoted dog 143 to pivot downwardly but yieldingly urges it to return to its abutting relation with the stop pin 145. When the slide latch 140 is in its non-operating position the repeat actuating lever 137 will have been swung to its extreme right on forward position, as shown by FIGURES 18 and 19. To operate the repeat mechanism 136, the lever 137 is swung to the left as shown by dotted lines in FIGURE 19, causing the slide latch 140 to slide rearwardly carrying the pivoted dog 143, which now lies in the path of the crank 127. The crank 127, when rotated by operation of the operating lever 18 to positions C and D will slide past the pivoted dog 143 as the crank 127 engages the top portion of the dog 143 and causes it to pivot about the pin 144. However, after the crank 127 has swung past the pivoted dog 143, the latter will swing back to its normal position against the stop pin 145 so that now the crank can only swing in an arc below the pivoted dog 143 from C to D and back to position C. As will be explained hereinafter, at position D the printing of a check takes place. When the operating lever 18 is swung from position C to D the check in the slot 15 becomes imprinted. The operating lever 18 is returned to position C where the dog 143 prevents any further return movement of the operating lever, the printed check is removed from the slot 15 and a new blank check placed therein. The operating lever 18 is again swung to position D and causes that check to be imprinted. This can be repeated as long as desired at which time actuation of the repeat lever 137 will cause the dog 143 to slide away from the crank 127 and permit the latter to swing freely back to position A of the operating lever 18.

As stated hereinabove with each depression of a numeral button 31, the carriage assembly moves one space to the left and at the same time the shaft 107 rotates one increment, to slide the carriage return lever the distance equivalent to one space. Also secured to the shaft 107 at its lower portion is a collar 149 having a depending finger or cog 150 which upon rotation of the shaft 107 and collar 149 will engage a similar upstanding finger or cog 151 mounted on a collar 152. See FIGURES 3, 4 and 16. The collar 152 is rotatably mounted on the shaft 107 to rotate freely thereon. Attached to the collar 152 is an arm 153 whose free end is bifurcated as at 154 for receiving a pin 155 mounted on the printing plate 95. The printing plate 95 is provided with type on its lower face which prints the following "Sum $." In lieu of the word Sum there may be the name of the company who is the maker of the check. A coil spring 157 is secured to the freely rotatable collar 152 so that the arm 153 and the printing plate 85 are yieldingly urged in the direction of the numeral wheels 85. As has been pointed out hereinabove, four numeral wheels 85 are slotted as at 94 to receive the sum printing plate 95, while the first three wheels 85 are not slotted, the printing plate 95 coming to rest against the third numeral wheel 85. The cogs 150 and 151 are separated a distance equal to three space movements of the carriage assembly 52 so that when the fourth numeral button 31 is depressed the cog 150 will impinge on the cog 151 to cause the collar 152 to rotate and the arm 153 to swing sliding the sum printing plate 95 one space distance to the left. The sum printing plate 95 will have slid out of the slot 94 of the fourth numeral printing wheel 85 thereby freeing that numeral wheel 85 to rotate. Consequently if a seven digit number is to be printed by the check writer, upon depressing the first three numeral buttons 31 the sum printing plate 95 will remain stationary, then upon depressing the next four numeral buttons 31, the printing plate 95 will shift along the slots 94 to the left to free the four numeral printing wheels 85. This construction assures the printing of "Sum $" directly adjacent to the first digit on the left in the same position as would be normally written.

Mounted on the lower wall 29 and extending through an opening therein is a conventional date stamp or printing plate 96. The date printing plate has thereon the month, day and year so constructed and arranged that the current date will appear on the lower side at the same distance below the lower surface of the wall 29 as the "sum $" plate 95 and the numerals mounted on the numeral wheels 85.

On the inside surface of each side wall 13 and 14 there is mounted a slide bracket 160 having slots 161 for receiving pins 162 secured to the walls 13 and 14 to permit the slidable movement of the slide brackets 160 along the wall. See FIGURES 11-15 inclusive. The slide brackets 160 are each provided with an L-shape arm portion 163 on which is secured the end portion of the rack stop member 93 that extends across the width of the device. As stated hereinbefore, the rack stop member 93 abuts against the ends of the rack members 80 to prevent sliding movement thereof until released upon movement of the slide bracket 160. Both of the slide brackets 160 are provided with teeth 164 which are in mesh engagement with a pinion gear 166 rotatably mounted on the walls 13 and 14 by a pin 167. The pinion gears 166 have mounted thereon a flat disk wheel 168 along a portion of whose periphery is a cam surface 169. Each of the pinion gears 166 engages an intermittent gear 170 on a portion of which are gear teeth 171 which engage the pinion gear 166. Mounted on each of the intermittent gears 170 are disks 172 whose periphery is in approximate contact with the cam surface 169. At the position of the teeth 171 on the gear 170, there is radially aligned therewith a periphery 173 of reduced radius on the disks 172 formed by shoulders 174 to permit rotational movement of the cam wheel 168 when the teeth 171 are in mesh engagement with the gear wheel 166. When the operating lever 18 is actuated and moved from position A (wherein the mechanism is positioned as shown by FIGURE 12) to position B the main shaft 20 will rotate causing the intermittent gears 170 and inner disk wheels 172 to rotate in unison, and the only action produced is the operation of the carriage return mechanism 21 as explained hereinabove. The cam surface 169 will slide along the periphery of the disk wheel 172 until the midportion of the cam surface 169 arrives at the shoulder 174 as shown by FIGURE 14. The gear wheel 166 will then mesh with the teeth 171 to cause the gear wheels 166 to rotate and the slide brackets 160 to slide rearwardly carrying the rack stop member 93 to the rear. Now that the rack stop member 93 no longer abuts against the ends of the rack members 80, the coil springs 89 will force the rack members 80 to slide rearwardly until their shoulders 92 are engaged by the depressed numeral selector stops 51. As the rack members 80 are sliding rearwardly, their respective numeral printing wheels 85 are rotated to expose the proper numeral on their lower sides as explained hereinabove. When the operating lever 18 has arrived at position C as shown by FIGURE 15, the slide brackets 160 will have reached their rearmost position and the pinion gear 166 will have arrived at the end of the teeth 171 of the intermittent gears 170. It is to be noted that there is no numeral selector stop 51 corresponding to the numeral 9. See FIGS. 7-10 inclusive. Upon depressing the "nine" numeral button 31, no selector stop 51 is actuated so that the rack member 80 in question will slide to its rearmost position as shown by FIG. 15. At this position the rack member 80 will have caused the numeral printing wheel 85 to have turned sufficiently to cause the numeral nine to be in position to print.

As the operating lever 18 is actuated to move from position C to position D, as shown by FIGURE 13, a plurality of pins 176 secured to the main shaft 20 will engage further pins 177 that are mounted on cam frame members 178. There are three pairs of cam frame members 178, each pair being connected together by a tie rod 179 which normally rests on its own slide cam 180. See FIGURES 11 and 12. The main shaft 20 is received by elongated openings 181 in each of the cam frame members 178 so that as the pins 176 engage the pins 177, the cam frame members 178 will be made to slide rearwardly. Mounted above each cam frame member 178 is a second frame member 182 all of which are pivotally mounted by a shaft 183 whose ends are mounted on the walls 13 and 14. Each pair of frame members 182 are secured together by tie rods 184 to form a support for matrices 185, 186 and 187. See FIGURES 11-13 inclusive. The tie rods 184 normally rest on the cam frame members at the foot of an inclined or cam surface 188. As the operating lever 18 continues to swing toward position D, the cam frame members 178 will slide rearwardly against the coil springs 189 that extend between the forward ends of the cam members 178 and a post 190. The tie rods 184 are then made to slide up the inclined surfaces 188 causing the matrix support frame members 182 to pivot upwardly about the shaft 183 and matrices 185, 186 and 187 are brought into contact with the "sum $" printing plate 95, numeral wheels 85, the signature printing plate 97 and the date printing plate 96, respectively.

Means are provided to prevent any or all of the printing from being accomplished on the check consisting of the slide cams 180 having an inclined surface 191 and an elongated member 192 extending forwardly of the slide cam 180. These members 192 are provided with an elongated slot 193 in which pins 194 are positioned and secured to the bottom wall 11 to permit sliding movement of the slide cams 180. Each of the forward end of the elongated members 192 is provided with an upstanding portion 195 to which is secured a non-print operating lever 196. The levers 196 extend forwardly and are received by slots 204 in a face plate 197. The non-print operating levers 196 are provided with a shoulder 198 that engages the inner edge of the face plate 197 to prevent the slide cams 180 from sliding forwardly. Coil springs 199 extending between the upstanding members 195 and the face plate 197 yieldingly urge the sliding movement of the slide cams 180 in the direction of the face plate 197. On the free ends of the non-print operating levers 196 are buttons 23, 24 and 25. When any of the buttons 23 have been lifted or forced upwardly, the shoulder 198 will slide upwardly in the slot 204 to become disengaged from the face plate 197. The slide cam 180 will then be forced forwardly by the coil springs 199. The tie rods 179 that had been resting on the top surface of the slide cam 180 will now slide downwardly on the inclined surface 191 to assume the position shown by FIGURE 17. The cam frame members 178 will swing downwardly as will also the matrix support frame 182. Now, the matrix 18 cannot come into contact with the printing plates to accomplish the printing that would have been effected if the slide cam 180 were in its rearward normal position supporting the tie rod 179 on its upper surface. The button 23 controls the printing of the word "sum $" and the amount to be printed on the check. The button 24 controls the printing of the signature and the button 25 controls the printing of the date. If it is desired that the check writer 10 effect no printing operation, the button 22 may be used to release all of the operating levers 196. The button 22 is mounted on the end of a finger 200 which extends through a slot in the face plate 197, the other end being secured to a release plate member 201 which lies along the inner portion of the face plate 197. The release plate member 201 is loosely secured to the base of the face plate by bolts 202 which permit the upward tilting movement of the button 22 along with the forward edge of the release plate member 201. By pushing upwardly on the non-print button 22, the forward edge of the release plate member 201 will engage the non-printing operating levers 196 at the position of the shoulders 198 and push all of the operating levers 196 upwardly to disengage the shoulders 198 from the face plate 197. All of the non-print operating levers 196 will slide forwardly to lower the various matrices to their non-printing position as explained hereinbefore. In the event an error in the amount of money has been made and discovered after the operating lever 18 has been actuated, prior to the printing of the check, the non-print button 22 is slid upwardly and all of the non-print buttons 23, 24 and 25 will be actuated to prevent any printing to take place. The operating lever 18 is then returned to its original position to start anew using the same blank check. Screws 203 secure the foot of the face plate 197 to the lower wall 11.

By use of the selective non-print buttons 22, 23, 24 and 25 the checks being printed can be produced in any of a number of different ways. For example, a key and lock may be provided in lieu of the signature button 25 so that all the checks may be printed without a signature. Then when the responsible official whose duty is to have the checks signed, may then operate the check writer with the amount and date buttons 23 and 25 released so that only the signature may be imprinted on the check. Mounted on the upper portion of the side walls 13 and 14 and extending across the width of the device are a pair of ribbon rolls 205 each being positioned at the forward and rear portion thereof. A ribbon which extends between the ribbon rolls 205 lies on the various matrices in proximity to the opposed printing plates 95, 96 and 97. To replace the ribbon 206 all that need be done is lift out the keyboard chassis X from the main chassis Y. The spools 205 are then removed along with the ribbon 206. New spools 205 are replaced with the new ribbon 206 extending beneath the rack stop member 93. The ribbon 206 will then lie on all of the matrices. When the keyboard chassis X is made to slide along the tracks 126 back into position within the main chassis Y the ribbon 206 will be in position to effect a printing action on a check placed in the slot 15.

In the normal operation of my check writer, a check is first inserted into the slots 15 and then the appropriate numeral buttons 31 are depressed. As the numeral buttons 31 are being depressed, the numeral selector stops 51 are depressed and the carriage 52 moves to the left above the rack members 80. At the same time the carriage return lever 110 is sliding along the slot 111 beneath the slide lever 121 and the printing plate "sum $" is made to slide outwardly of the slots 94 in the numeral printing wheels 85.

Now the operating lever 18 is grasped and forced forwardly and as it swings from position A to position B the carriage return mechanism 21 consisting of the bracket 114 and carriage return lever 110 are shifted rearwardly in preparation to performing its carriage moving function when the operating lever 18 is being returned to its starting position A. As the operating lever 18 moves from position B to C the rack stop member 93 is made to slide rearwardly to release the spring loaded rack members 80. The rack members 80 will now individually slide rearwardly until stopped by the numeral selector stop 51 which impinges on the shoulder 92 of the rack members 80. At the same time that the rack members 80 are sliding rearwardly the numeral printing wheels 85 are caused to be rotated thereby exposing the proper numeral at the lower surface of the printing wheel 85. The printing wheels 85 whose rack members 80 were not permitted to slide because of the size of the numeral being printed will not rotate since the "sum $" printing plate 95 will not have left the slot in that printing wheel 85. Movement of the operating lever 18 from position C to D will then cause the matrices 185 to move upwardly against the check and the ribbon 206 and the printing plates 95, 96 and 97 to cause the checks to become imprinted. The operating lever 18 is then swung back to its original position A and in the movement from position D to position C the matrices 185 are made to move downwardly away from their respective printing plates. The check may now be removed from the slots 15. In the movement of the operating lever from position C to B, the rack stop member 93 slides forwardly pushing the rack members 80 back to their original position, whose movement returns all of the numeral printing wheels 85 back to their original zero position. Continued movement of the operating lever 18 back to its original position A, at position E the shoulder 118 of the slide lever 121 engages the carriage return lever 110 and forces the latter to swing rearwardly to cause the carriage 52 to slide back to its original position.

When the carriage 52 slides backwardly to its original position, the numeral selector stops 51 which had been depressed will abut against the inclined surface 78 at the leading edge of the wall 79 to force the stops 51 upwardly to their original position. At the same time the escapement stop members 70 that had been depressed will engage the cam surface 76 and are made to slide upwardly to their original position. The force returning the carriage 52 to its starting position will cause it to slide beyond its original position so that the numeral selector stops 51 in the first row as well as the first escapement stop 70 will be restored to their non-actuated, elevated position. Then the force of coil spring 60 will cause the carriage 52 to slide forwardly on the rod 56 until the first stop member 70 engages the shoulder 77 of the header 73 at which position the carriage 52 is ready for operation in the printing of the next check. At the same time, the "sum $" printing plate 95 is made to slide to the right along the slots 94 in the first four numeral printing wheels 85. With the operating lever 18 back to its original position A the check writer is now ready to be operated again.

If two or more checks are to have the same information printed thereon, the repeat actuating lever 137 is actuated and the operating lever 18 swung forwardly to its printing position D. The pivoted dog 143 will permit the crank 127 to swing past when the operating lever 18 is at position C. Now, the operating lever 18 may swing only from C to D and return to C after which the first check is removed and another check placed in the slot 15 when the operating lever 18 is again swung to D to repeat the printing information on the second check. This can be repeated as long as desired and is particularly useful when a great many checks issued on the same date with the same amount must be printed. It is to be noted that the repeat actuating lever 137 may be actuated at any position of the operating lever 18 while on its forward movement even after the first check has been printed but prior to the operating lever 18 being returned position E.

What I claim as new and desire to secure by Letters Patent is:

1. A check writer comprising a support, a plurality of elongated rack members mounted longitudinally on said support in spaced parallel relation and for slidable movement, each of said rack members having a plurality of teeth on one side and shoulder means on the other side, a gear in mesh engagement with each of said plurality of teeth of said racks, a numeral printing wheel secured to each of said gears, said numeral printing wheel having numeral type affixed to the periphery thereof for printing on a check, resilient means for slidably moving said rack members, holding means abutting against said rack members preventing the sliding movement of said rack members, carriage means mounted on said support above and out of alignment with said rack members, said carriage means having a plurality of rows of numeral selecting stop means, means for actuating one of said numeral selecting stop means in each of said rows, escapement means operatively connected to said actuating means for sliding said carriage into alignment with said rack members in the direction of said rack members and said rows of numeral selecting stop means, operating means for moving said holding means whereby said resilient means effect the sliding movement of said rack members, said actuated numeral stop means engaging said shoulder means and arresting the sliding movement of said rack members at predetermined positions and said numeral printing wheels rotating to expose selected numerals for printing on a check.

2. A check writer comprising a support, a plurality of elongated rack members mounted longitudinally on said support in spaced parallel relation and for slidable movement, each of said rack members having a plurality of teeth on one side and shoulder means on the other side, a gear in mesh engagement with each of said plurality of teeth of said racks, a numeral printing wheel secured to each of said gears, said numeral printing wheel having numeral type affixed to the periphery thereof for printing on a check, resilient means for slidably moving said rack members, holding means abutting against said rack members preventing the sliding movement of said rack members, carriage means mounted on said support above and out of alignment with said rack members, said carriage means having a plurality of rows of numeral selecting stop means, means for actuating one of said numeral selecting stop means in each of said rows, escapement means operatively connected to said actuating means for sliding said carriage into alignment with said rack members in the direction of said rack members and said rows of numeral selecting stop means, operating means for moving said holding means whereby said resilient means effect the sliding movement of said rack members, said actuated numeral stop means engaging said shoulder means and arresting the sliding movement of said rack members at predetermined positions, said numeral printing wheels rotating to expose selected numerals for printing on a check, matrix holding means mounted in spaced relation to said selected numerals on said numeral printing wheels and means operatively connected to said operating means and to said matrix holding means for moving said matrix holding means in the direction of said selected numerals for printing said numerals on a check.

3. A check writer comprising a plurality of slidably mounted rack members, a plurality of numeral printing wheels, gear means connecting said rack members and said printing wheels, a carriage having a plurality of numeral selecting stop means, means for actuating said numeral selecting stop means, escapement means for sliding said carriage in alignment with said rack members, operating means sliding said rack members to said numeral selecting stop means and rotating said numeral printing wheels to expose a selected numeral for printing on a check, matrix holding means mounted in spaced relation to said selected numerals on said numeral printing wheels, further means operatively connected to said operating means for moving said matrix holding means in the direction of said selected numerals for printing on a check, still further means for returning said rack members to their original positions and said carriage to its original position out of alignment with said rack members and cam means mounted on said support in the path of said returning carriage whereby said actuated numeral selecting stop means are restored to their non-actuated positions.

4. A check writer comprising a plurality of slidably mounted rack members, a plurality of printing wheels having numerals mounted on said wheels, gear means connecting each of said rack members with one of said numeral printing wheels, holding means engaging said rack members preventing the sliding movement of said rack members, a carriage having a plurality of rows of numeral selecting stop means, means for actuating one of said numeral selecting stop means in each of said rows, further means operatively connected to said actuating means for moving said carriage whereby said rows of numeral selecting stop means become aligned with said rack members, actuating means for moving said rack member holding means whereby said rack members are permitted to slide to said numeral selecting stop means and effect the rotation of said numeral printing wheels whereby selected numerals are exposed by said wheels for printing on a check, matrix holding means mounted in spaced relation to said selected numerals on said numeral printing wheels, means operatively connected to said operating means and to said matrix holding means for moving said matrix holding means in the direction of said selected numerals for printing said numerals on a check, carriage return means operatively connected to said actuating means for sliding said carriage to its original position and cam means mounted in the path of said returning carriage for restoring said actuated numeral selecting stop means to their non-actuated positions.

5. A check writer comprising a support, a plurality of elongated rack members mounted longitudinally on said support in spaced parallel relation and for slidable movement, each of said rack members having a plurality of teeth on one side and shoulder means on the other side, a gear in mesh engagement with each of said plurality of teeth of said racks, a numeral printing wheel secured to each of said gears, said numeral printing wheel having numeral type affixed to the periphery thereof for printing on a check, resilient means urging the sliding movement of said rack members, holding means abutting against said rack members preventing the sliding movement of said rack members, carriage means mounted on said support above and out of alignment with said rack members, said carriage means having a plurality of rows of numeral selecting stop means, means for actuating one of said numeral selecting stop means in each of said rows, escapement means operatively connected to said actuating means for simultaneously sliding said carriage in the direction of said rack members and said rows of numeral selecting stop means into alignment with said rack members, operating means for moving said holding means whereby said resilient means urges the sliding movement of said rack members, said actuated numeral stop means arresting the sliding movement of said rack members at predetermined positions, said numeral printing wheels rotating to expose selected numerals for printing on a check, matrix holding means mounted in spaced relation to said selected numerals on said numeral printing wheels, means operatively connected to said operating means and to said matrix holding means for moving said matrix holding means in the direction of said selected numerals for printing said numerals on a check, carriage return means operatively connected to said operating means, for sliding said carriage to its original position and cam means mounted in the path of said returning carriage for restoring said actuated numeral selecting stop means to their non-actuated positions.

6. A check writer comprising a plurality of slidably mounted rack members, a plurality of numeral printing wheels, gear means connecting said rack members and said printing wheels, a carriage having a plurality of numeral selecting stops means, means for actuating said numeral selecting stop means and sliding said carriage in alignment with said rack members, operating means sliding said rack members to said numeral selecting stop means and rotating said printing wheels whereby selected numerals are exposed by said printing wheels, matrix holding means mounted in spaced relation to said selected numerals on said numeral printing wheels, means operatively connected to said operating means and to said matrix holding means for moving said matrix holding means in the direction of said selected numerals for printing said numerals on a check, cam means operatively connected to said matrix holding means and further means connected to said cam means for moving said cam means whereby upon the actuation of said operating means, said operatively connected means are rendered ineffective to move said matrix holding means a sufficient distance in the direction of said exposed numerals for printing said numerals on a check.

7. A check writer comprising a support, a plurality of elongated rack members mounted longitudinally on said support in spaced parallel relation and for slidable movement, each of said rack members having a plurality of teeth on one side and shoulder means on the other side, a gear in mesh engagement with each of said plurality of teeth of said racks, a numeral printing wheel secured to each of said gears, said numeral printing wheel having numeral type affixed to the periphery thereof for printing on a check, resilient means for slidably moving said rack members, holding means abutting against said rack members preventing the sliding movement of said rack members, carriage means mounted on said support above and out of alignment with said rack members, said carriage means having a plurality of rows of numeral selecting stop means for actuating one of said numeral selecting stop means in each of said rows, escapement means operatively connected to said actuating means for sliding said carriage in the direction of said rack members and said rows of numeral selecting stop means into alignment with said rack members, operating means for moving said holding means whereby said resilient means effect the sliding movement of said rack members, said actuated numeral stop means engaging said shoulder means and arresting the sliding movement of said rack members at predetermined positions, said numeral printing wheels rotating to expose selected numerals for printing on a check, matrix holding means mounted in spaced relation to said selected numerals on said numeral printing wheels, means operatively connected to said operating means and to said matrix holding means for moving said matrix holding means in the direction of said selected numerals for printing said numerals on a check, cam means operatively connected to said matrix holding means, and further means connected to said cam means for moving said cam means whereby upon the actuation of said operating means said operatively connected means are rendered ineffective to move said matrix holding means a sufficient distance in the direction of said exposed numerals for printing said numerals on a check.

8. A check writer comprising a plurality of slidably mounted rack members, a plurality of numeral printing wheels, gear means connecting said rack members and said printing wheels, a carriage having a plurality of numeral selecting stop means, means for actuating said numeral selecting stop means and sliding said carriage in alignment with said rack members, operating means sliding said rack members to said numeral selecting stop means and rotating said numeral printing wheels to expose a selected numeral for printing on a check, matrix holding means mounted in spaced relation to said selected numerals on said numeral printing wheels, further means operatively connected to said operating means for moving said matrix holding means in the direction of said selected numerals for printing on a check, still further means for returning said rack members to their original positions and said carriage to its original position out of alignment with said rack members and lever means coacting with said operating means for permitting repeated movement of said matrix holding means in the direction of said selected numerals for printing a multiplicity of checks.

9. A check writer having a support, substantially ten numeral designating buttons slidably mounted substantially vertically on said support, a carriage slidably mounted substantially horizontally below said buttons, said carriage having a plurality of rows of numeral selecting stop members each row being one increment apart, there being substantially nine stop members in each of said rows, lever means actuated by said buttons for depressing said stop members, escapement means coacting with said lever means for sliding said carriage one increment for each actuation of said lever means by said buttons, a plurality of rack members mounted in parallel relation each one increment apart with the first rack member being out of vertical alignment by a distance of one increment, each of said rack members having a plurality of teeth on the lower side and a shoulder on the upper side, said shoulder adapted to abut against a depressed numeral selecting stop member in alignment therewith, a gear in mesh engagement with said teeth of said racks, a numeral printing wheel secured to each gear, said wheels having numeral type affixed to the periphery thereof for printing on a check, a coil spring connected to each of said rack members urging the sliding movement thereof, a holding member abutting against said racks preventing their sliding movement, an elongated frame holding a matrix pivotally mounted at one end in spaced relation to said numeral printing wheels, a cam surface supporting said frame at the other end, an operating lever, a shaft connected to said operating lever and means cooperatively connecting said shaft and said holding member whereby upon the actuation of said operating lever said holding member is moved away from said racks and said coil springs urge said racks to slide a distance permitted by said depressed numeral selecting stop members and further cooperative means connected to said cam surface for moving said matrix in the direction of said numerals on said printing wheels for printing said numerals on a check.

10. The structure as recited by claim 9 and sliding means mounted in contact relation with said cam surface for rendering said further cooperative means ineffective thereby rendering said check writer incapable of printing numerals on a check.

References Cited in the file of this patent

UNITED STATES PATENTS

| | | |
|---|---|---|
| 2,091,778 | Garbell | Aug. 31, 1937 |
| 2,281,851 | Mehan | May 5, 1942 |
| 2,346,265 | Mehan | Apr. 11, 1944 |
| 2,503,865 | Christian | Apr. 11, 1950 |
| 2,659,301 | Goodbar | Nov. 17, 1953 |
| 2,707,432 | Rindfleisch | May 3, 1955 |
| 2,794,387 | Schultz | June 4, 1957 |
| 2,800,074 | Busch | July 23, 1957 |